S. J. VESELY.
SHOCK ABSORBER.
APPLICATION FILED OCT. 3, 1919.
1,384,545. Patented July 12, 1921.
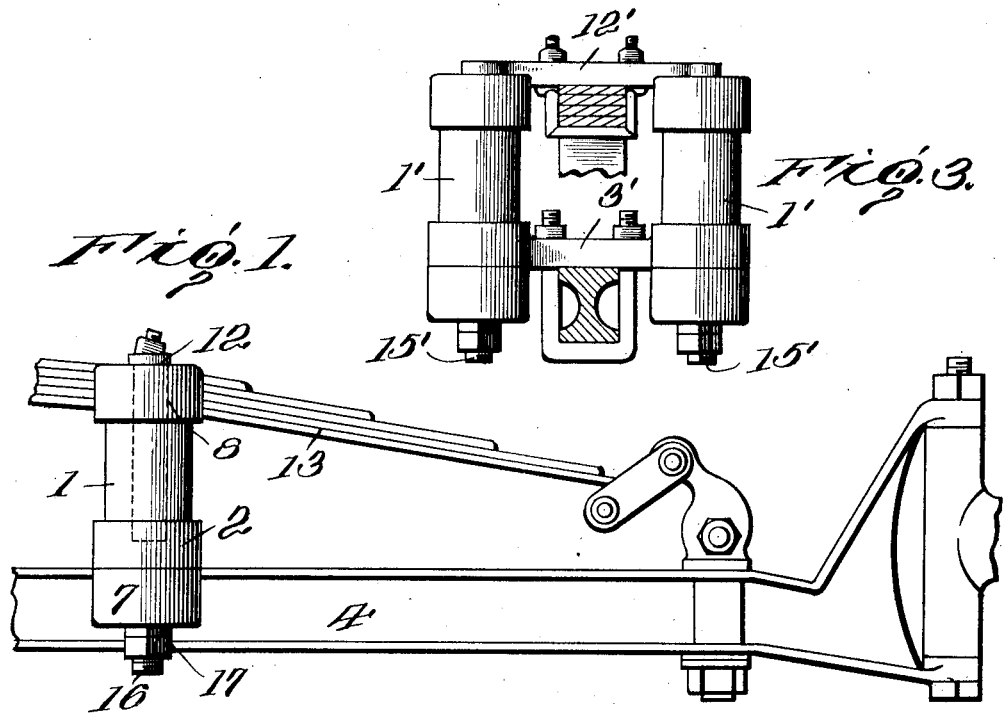
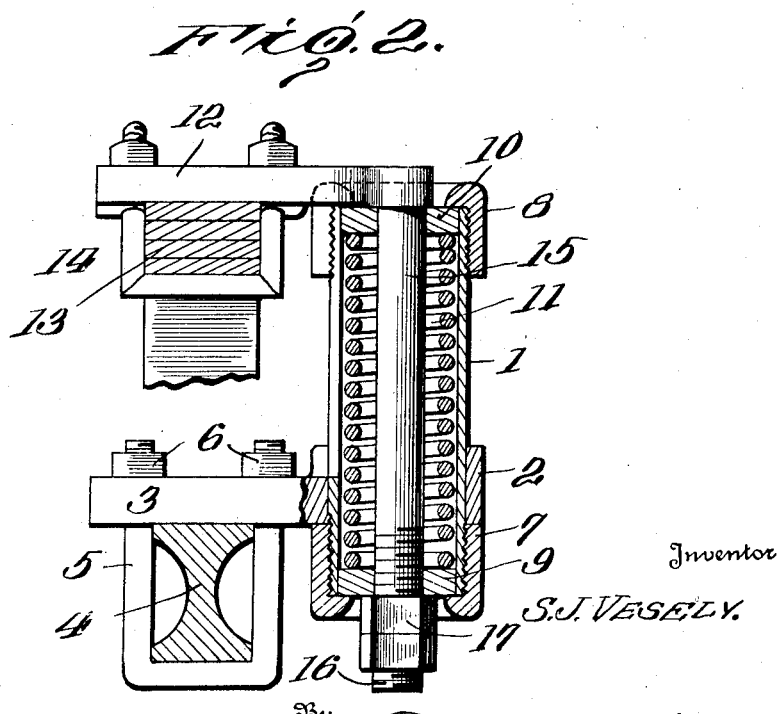

UNITED STATES PATENT OFFICE.

STANLEY J. VESELY, OF CEDAR RAPIDS, IOWA.

SHOCK-ABSORBER.

1,384,545.   Specification of Letters Patent.   Patented July 12, 1921.

Application filed October 3, 1919. Serial No. 328,256.

*To all whom it may concern:*

Be it known that I, STANLEY J. VESELY, a citizen of the United States, residing at Cedar Rapids, in the county of Linn and State of Iowa, have invented certain new and useful Improvements in Shock-Absorbers, of which the following is a specification, reference being had therein to the accompanying drawing.

This invention relates to certain new and useful improvements in shock absorbers for motor vehicles, and is a companion application of my application executed on even date herewith, the object being to provide a construction of shock absorber which is especially adapted to be used in connection with Ford type of motor vehicles, where the spring supports are arranged transversely of the machine instead of longitudinally thereof.

Another and further object of the invention is to provide a construction of shock absorber which will not only relieve the shock, but will prevent side swing.

A still further object of the invention is to provide a construction which can be readily attached to the axle and spring in such a manner that a rigid connection is formed, whereby the shock absorbing member will relieve the spring of the shock and prevent the car from swinging sidewise.

Other and further objects and advantages of the invention will be hereinafter set forth and the novel features thereof defined by the appended claims.

In the drawings:

Figure 1 is a side elevation of a portion of an automobile showing the application of my improved construction of shock absorber.

Fig. 2 is a vertical section of a shock absorber.

Fig. 3 is a detail elevation showing the construction especially adapted to be used in connection with light trucks.

In carrying out my invention, I employ a cylinder 1, which is mounted in a suitable support 2, conforming to the shape of the cylinder and having an arm 3, which is adapted to extend over the front axle 4 of the motor vehicle and be secured thereto by a U-shaped clip 5, the legs of which are threaded and on which are mounted nut 6, as shown in Fig. 2. The cylinder 1 is provided with threaded ends carrying caps 7 and 8 which are apertured as clearly shown in order to form supports or abutments for washers 9 and 10, mounted within the cylinder upon the ends of a coil spring 11. An arm 12 is secured to the spring 13 of the motor vehicle by a U-shaped clip 14, the legs of which are threaded to receive nuts for securing the same rigidly to the spring. The said arm is provided with a depending rod 15, at its outer end which extends through the washers 9 and 10, and is provided with a threaded portion 16 on which are mounted nuts 17, one of said nuts serving the purpose of a lock nut so as to hold the same in adjusted position and by this construction the tension of the spring can be regulated.

With this construction, the upper cap 8, is notched to receive the arm 12, carried by the spring of the motor vehicle and the lower cap can be removed so as to replace any of the parts or in assembling the device the lower cap can be placed on last after the parts have been inserted.

The cylinder 1 is provided with a slotted wall as clearly shown in Fig. 2, which registers with the notch of the cap 8, and allows the arm 12 to work up and down in the slot of the cylinder.

In the form shown in Fig. 3, the construction is identical with that shown in Figs. 1 and 2 with the exception that the arms 3' and 12' are extended to each side and the arm 3' carries cylinders 1' adapted to receive coil springs and washers as shown in the preferred form. The arm 12' in this form carries a rod 15' at each end which extends through the washers and springs of the cylinders and are adapted to carry nuts for adjusting the tension of the springs within the respective cylinders. This form is especially adapted to be used in connection with Ford trucks and other similar light trucks, and it will be seen that when a motor vehicle is equipped with a shock absorber of this character, the spring is guided and prevented from swinging in any direction but up and down.

From the foregoing description it will be seen that I have provided a shock absorber composed of very few parts which can be readily attached to the axle and spring of a motor vehicle so as to relieve the spring and prevent the same from swinging.

I claim:

1. A shock absorber for motor vehicles comprising a supporting arm adapted to be attached to the axle of the vehicle, a slotted cylinder carried by said arm, a coiled spring mounted within said cylinder, a washer mounted within said cylinder at each end of said spring and an arm carried by the spring of the vehicle extending into the slot of said cylinder having a rod extending through said washers and spring and provided with means at one end for adjusting the tension of said spring within said cylinder.

2. A shock absorber for motor vehicles comprising an arm adapted to be secured to the axle of a motor vehicle, a cylinder carried by said arm having a slot, a notched cap mounted upon said cylinder, a coil spring arranged within said cylinder, a washer arranged within said cylinder at each end bearing upon the ends of said spring, an arm carried by the spring of the motor vehicle extending through the slot of the cylinder having a depending rod extending through the washers and spring of said cylinder and nuts mounted on the lower end of said rod for adjusting the tension of said spring within said cylinder.

In testimony whereof I hereunto affix my signature in the presence of two witnesses.

STANLEY J. VESELY.

Witnesses:
L. PAUSEK,
C. S. LUBERGER.